United States Patent
Kroll

Patent Number: 5,927,854
Date of Patent: Jul. 27, 1999

[54] EQUIPMENT STRESS MONITOR

[75] Inventor: Marc Kroll, Amiens, France

[73] Assignee: Honeywell S.A., Montigny Le Bretonneux, France

[21] Appl. No.: 08/817,590

[22] PCT Filed: Oct. 9, 1995

[86] PCT No.: PCT/IB95/00895

§ 371 Date: Apr. 8, 1997

§ 102(e) Date: Apr. 8, 1997

[87] PCT Pub. No.: WO96/11388

PCT Pub. Date: Apr. 18, 1996

[30] Foreign Application Priority Data

Oct. 8, 1994 [GB] United Kingdom .................. 9420320

[51] Int. Cl.⁶ .............. G01K 3/00; G01K 7/00; G01N 3/60
[52] U.S. Cl. ............. 374/102; 374/57; 374/166
[58] Field of Search ............. 374/57, 102, 104, 374/141, 166

[56] References Cited

U.S. PATENT DOCUMENTS

| | | | |
|---|---|---|---|
| 3,035,443 | 5/1962 | Gray | 374/102 |
| 4,286,465 | 9/1981 | Thomae | 374/57 X |
| 4,733,974 | 3/1988 | Hagerman | 374/104 |
| 5,255,149 | 10/1993 | Matsuo | 374/166 X |

Primary Examiner—Richard Chilcot
Assistant Examiner—Robin Clark
Attorney, Agent, or Firm—Anthony Miologos

[57] ABSTRACT

An electronic apparatus that includes means for determining the temperature stress the equipment has been subjected to is disclosed that includes a multiplexer with a plurality of inputs that read the temperature at various locations on the equipment being monitored. The temperature at each location is measured regularly to determine in which of a number of different-sized temperature bands it lies, thereby providing an indication of the stress to which the equipment is subjected.

12 Claims, 1 Drawing Sheet

EQUIPMENT STRESS MONITOR

BACKGROUND OF THE INVENTION

The present invention relates to electrical or electronic apparatus.

It is well-known that the expected life-time of electronic apparatus is very dependent on the temperature to which the apparatus has been subjected. For example, the expected life-time of semi-conductor based products may be halved for each prolonged rise in temperature of approximately 10 to 20° C. It is possible to formulate theoretical expectancy equations which relate the expected remaining life-time against time already operated at a certain temperature, from which estimates for the expected failure for the product can be established. However such equations are only valid on a large population, so for a user of only a few pieces of equipment it is not feasible to use this approach.

The present invention provides electrical or electronic apparatus characterised by means to determine in which of a plurality of predetermined temperature bands of differing size temperature ranges the apparatus ambient temperature is and means to record outputs of the determination means.

In this way, there is produced a record of the degree of stress to which the apparatus has been subjected and so allows the user to have an indication of how the life-time of the product has been shortened. By having temperature bands of differing sizes, careful and accurate monitoring of temperature regions of particular interest can readily be achieved. In one example, size of a band decreases with increased temperature.

BRIEF SUMMARY OF THE INVENTION

The invention may have any one or more of the following features:

(i) the determining means is operable on a number of temperature bands with temperature ranges of different sizes such that the size of the temperature range in a band decreases for increased values of temperature;

(ii) the frequency of measurement by the determining means is dependent on the temperature band;

(iii) the frequency of measurement increases as the temperature band of the previous measurement(s) increases;

(iv) the apparatus ambient temperature comprises a temperature value based on the temperature of a section of the apparatus and/or the environs of such a section;

(v) multiplexing means to switch the determining means between a plurality of measurement locations on the electronic apparatus and/or between a plurality of measurement locations on different pieces of equipment;

(vi) means to estimate failure or deterioration based on output from the determination means and/or the recording means.

The present invention also provides a method of monitoring electronic apparatus comprising determining in which of a plurality of predetermined temperature bands of differing size temperature ranges the apparatus ambient temperature is and recording outputs of the determination means.

The information resultant from the invention can be used in a variety of different ways. For example, the information can be displayed to the user of the apparatus by an appropriate display means e.g. a hand-held terminal, a PC screen (whether LCD or cathode, ray tube) or a printer. Alternatively or additionally, the information can be stored for use later e.g. when the apparatus is being maintained, serviced and/or repaired; such information would also be of assistance to the manufacturer in quality analysis and/or predicting failure-rates or life-times of subsequent apparatus.

The invention is applicable to a wide variety of types of apparatus, including in particular controllers, recorders, programmers, also flow, pressure or temperature transmitters.

The invention is particularly beneficial because the results achieved by the apparatus and method of the invention can be applied to certain well known and well-defined relationships of aging and stress against temperature, thereby resulting in accurate life-expectancy predictions which can readily and simply obtained. Such characteristics for electronic and electrical equipment follow well-defined processes and equations, so that monitoring according to the present invention can give very valuable information on expected failure, whereas mechanical equipment do not follow such well-defined processes because other less-precise operations are involved including e.g. motion of parts, mechanical stress, metal fatigue.

BRIEF DESCRIPTION OF THE SEVERAL VIEWS OF THE DRAWINGS

In order that the invention may more readily be understood, a description is now given, by way of example only, reference being made to the accompanying drawings, in which.

DETAILED DESCRIPTION OF THE INVENTION

Figure 1:
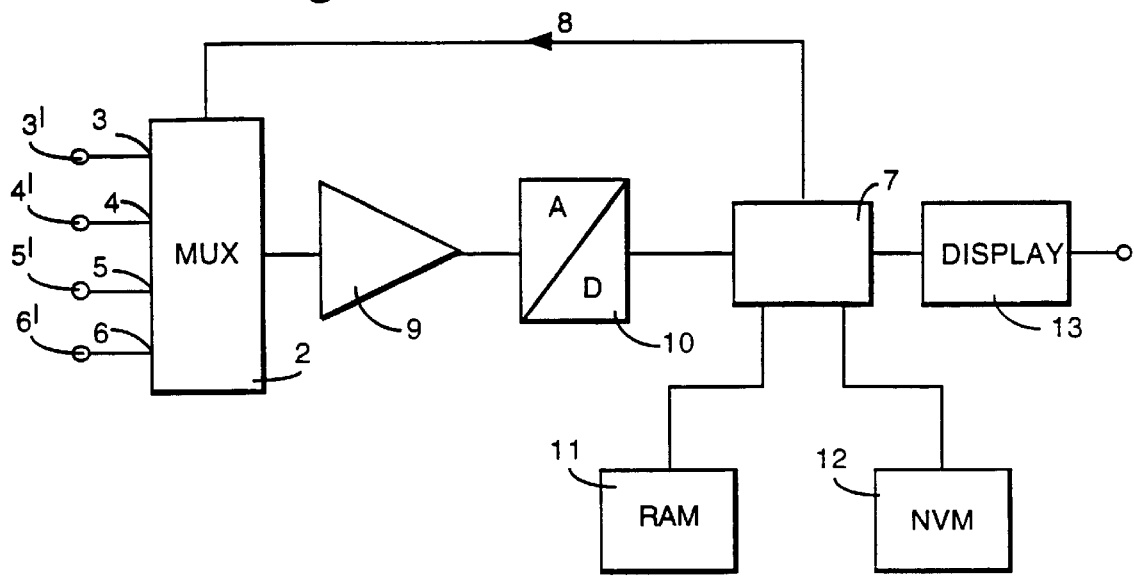
FIG. 1 is a block schematic drawing of a circuit embodying the present invention.

FIG. 1 shows a stress monitor generally designated as 1 within a temperature transmitter, the monitor 1 having a multiplexer 2 with a number of inputs 3 to 6 for temperature sensing at a number of locations while (for clarity), FIG. 1 does not show the inputs for process signals e.g. of pressure, flow, temperature. Thus inputs 3 to 6 are for signals representing the ambient temperature at various locations indicated by (i) $3^1$ on the housing of a thermowell associated with the temperature transmitter, (ii) $4^1$ on the printed circuit board of the thermowell, (iii) $5^1$ on the housing of the main unit of the transmitter and (iv) $6^1$ on the printed circuit board of the main unit. The ambient temperature is measured using the cold junction temperature sensor of a thermocouple.

A microcontroller 7 passes selection signals 8 to multiplexer 2 to control switching of multiplexer 2 between inputs 3 to 6 and a zero output mode, such that multiplexer 2 outputs appropriate signals representing temperature for each of locations $3^1$ to $6^1$ at a frequency suitable for the respective locations and for the respective temperature values as explained below. Each temperature signal output from multiplexer 2 passes to amplifier 9 for modification to the appropriate level required for A/D convertor 10 which provides the signal for input to micro controller 7.

Typically, the temperature at each location is measured once in a specified time, e.g. every 5 seconds. Each measurement is compared to the previous one and, if it does not exceed the previous one, it is dumped; if it exceeds the previous one it is stored in RAM 11 and the previous one is dumped. After an hour the stored value, which is the highest temperature measured in that hour, is used in determining which temperature band is to be allocated to that hour period. The process is then repeated for the next hour period.

However, in a variation, the frequency of selecting a temperature signal from each location (i.e. corresponding to the 5-second sampling above) and/or the frequency of determining and recording the relevant temperature band is or are dependent on what the location is and also the last temperature recording and/or sampling for that location. Thus the frequency of either or both operation increases when the temperature of that location increases and thereby the potential for stress effects increases. If there is some potential or actual relationship between temperature changes (whether in the same or opposite directions) in two or more locations due eg. to proximity or similarity in positions or components, then there may be appropriate changes in selection frequency of one such location commensurate with a change in selection frequency of another such location.

At microcontroller 7, the signal is processed so as to determine in which of a number of temperature bands it lies; each location has its own set of temperature bands and, for each set of temperature bands, the bands become smaller in terms of the size of the range of temperatures as the temperature increases. In this way, due account is taken of the accumulation or increase of stress which arises due to temperature with appropriate increased accuracy and definition with heightened stress.

Figure 2:
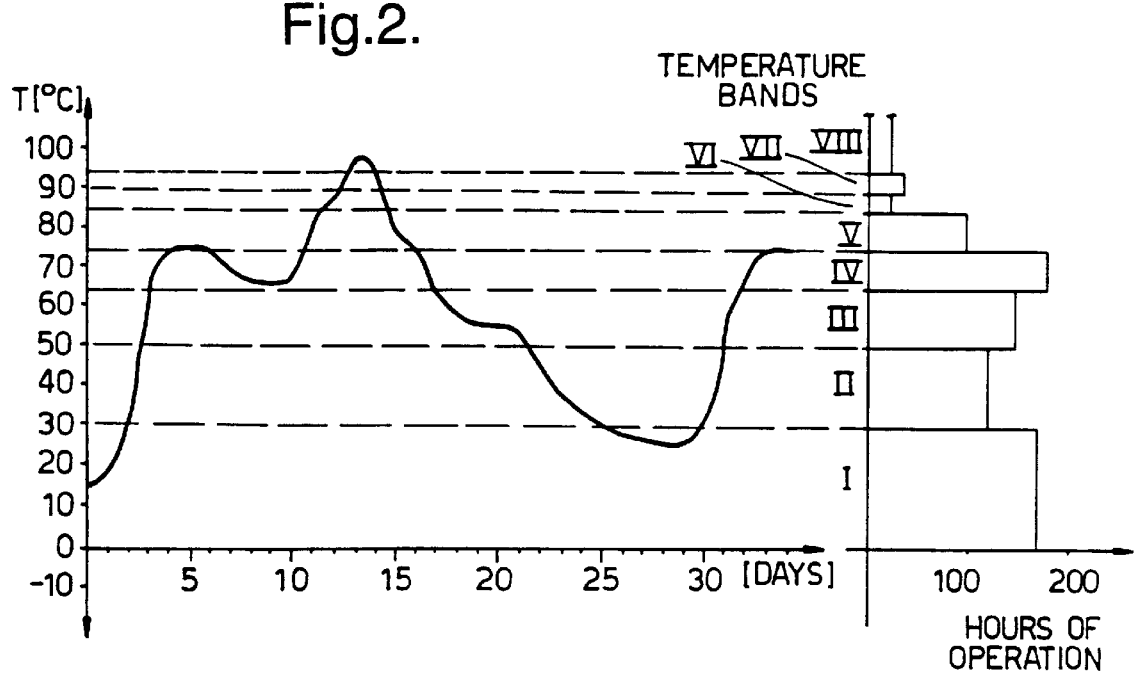
FIG. 2 is a graphic representation of information derived from the circuit of FIG. 1.

FIG. 2 represents graphically the temperature bands I to VIII for location $3^1$, namely the housing of the thermowell. The first temperature band I covers 0° C. to 30° C. i.e. a range of 30° C., whereas the next temperature band II has a reduced range of 20° C. and the subsequent band III has a further reduced range of 15° C., and so on.

Once microcontroller 7 has determined in which temperature band the signal lies, the information is passed to RAM store 11 enabling various treatments e.g. averaging and filtering, and then non-volatile memory 12 is up-dated. Microprocessor 7 also sends the information to a display 13 which provides a representation of the accumulated time recorded for each temperature band, as shown on the right-hand side of FIG. 2. This display gives the user an indication of the degree of excessive temperature to which the thermowell housing $3^1$ has been subjected and enabling the user to estimate readily and easily the shortened life-time. Such analysis can be accurate and hence very valuable to the operator because the stress/temperature relationship for electrical and electronic equipment is well-known and well-defined, much more so than for mechancial equipment which is subjected to many more variables, at least some of which are not well-defined or readily predictable.

The information on the temperature bands may also be input (either directly from microcontroller 7 or via RAM 11 or memory 12) into other equipment e.g. a hand-held terminal, a PC display (whether LCD or cathode ray tube) or a printer.

The data can be presented in any appropriate form e.g. on a PC screen it can be done in a histogram form, with the temperature band on the x-axis and the hours on the y-axis.

As well as being used by the user of the equipment, the accumulated information in memory 12 can be used when the product is being maintained, serviced or repaired; also the information can be used for quality analysis by the manufacturer.

The information collated under the invention can be used to predict and/or estimate failure and/or deterioration.

In an alternative version, the stress monitor can be embodied as a piece of equipment (whether stand-alone or incorporated into a controller or other apparatus) which monitors a number of separate products whether of the same type or different types e.g. flow transmitters, temperature transmitters, pressure transmitters, printers, valves, flowmeters.

The present invention has been described with particular reference to the preferred embodiments thereof. It will be obvious that various changes and modifications can be made therein without departing from the spirit and scope of the invention as defined in the appended claims.

What is claimed is:

1. An electrical or electronic apparatus comprising:

means to determine in which of a plurality of predetermined temperature bands of differing size temperature ranges the apparatus ambient temperature is, based on a measurement of the value of the temperature of at least one section of the apparatus, the frequency of measurement being dependant on the temperature band and the frequency of the measurement increasing as the temperature band of the previous measurements increases, whereby the sizes of the temperature ranges in the bands decrease for increased values of temperature; and means to record outputs of the determination means.

2. The apparatus according to claim 1 wherein the measurement of the value of temperature is based on the measurement of the temperature of a plurality of sections of the apparatus, said apparatus including multiplex means to switch the determining means between the plurality of measurement sections on the apparatus.

3. The apparatus according to claim 1 wherein the recording means comprises RAM means.

4. The apparatus according to claim 1 wherein the recording means comprises non-volatile memory means.

5. The apparatus according to claim 1 wherein there is further included to estimate failure or deterioration of the apparatus based on output from the determination means and/or the recording means.

6. A method of monitoring electronic apparatus comprising the steps of:

determining in which, of a plurality of predetermined temperature bands of differing size temperature ranges the apparatus ambient temperature is, based on a measurement of the value of the temperature of at least one section of the electronic apparatus, the frequency of measurement being dependant on the temperature band and the frequency of the measurement increasing as the temperature band of the previous measurements increases, whereby the sizes of the temperature ranges in the bands decrease for increased values of temperature; and recording outputs of the determination means.

7. The method according to claim 6 wherein the measurement of the value of temperature is based on the measurement of the temperature of a plurality of sections of the electronic apparatus, and the determining step comprises multiplexing between the plurality of measurement sections on the electronic apparatus.

8. The method according to claims 6 wherein the recording step comprises inputing into RAM means.

9. The method according to claims 6 wherein the recording step comprises inputting into non-volatile memory means.

10. The method according to claim 6 wherein there is further provided the step of estimating failure or deterioration of the apparatus based on the determining or recording stages.

11. The apparatus according to claim 2 wherein there is provided at least a second apparatus having at least one section of said second apparatus connected to said means for determining the measurement of the value of the temperature of the second apparatus section and said multiplex means switches the determining means between the apparatus measurement section and the second apparatus measurement section.

12. The method according to claim 7 wherein there is provided at least a second electronic apparatus having at least one section of said second electronic apparatus arranged for the measurement of the value of the temperature of the second electronic apparatus section, and said step of determining comprises multiplexing between the electronic apparatus measurement section and the second electronic apparatus measurement section.

* * * * *